(12) United States Patent
Balinsky et al.

(10) Patent No.: US 9,645,775 B2
(45) Date of Patent: May 9, 2017

(54) PRINTING COMPOSITE DOCUMENTS

(71) Applicant: HEWLETT-PACKARD DEVELOPMENT COMPANY, L.P., Houston, TX (US)

(72) Inventors: Helen Balinsky, Bristol (GB); Andrew M. Spencer, Eagle, ID (US); Nassir Mohammad, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/787,348

(22) PCT Filed: Jul. 11, 2013

(86) PCT No.: PCT/US2013/050074
§ 371 (c)(1),
(2) Date: Oct. 27, 2015

(87) PCT Pub. No.: WO2015/005922
PCT Pub. Date: Jan. 15, 2015

(65) Prior Publication Data
US 2016/0077776 A1    Mar. 17, 2016

(51) Int. Cl.
*G06F 3/12* (2006.01)
*G06F 21/60* (2013.01)
*H04L 9/32* (2006.01)
*H04N 1/44* (2006.01)
*H04L 9/08* (2006.01)
*H04L 29/06* (2006.01)

(52) U.S. Cl.
CPC .......... *G06F 3/1222* (2013.01); *G06F 3/1238* (2013.01); *G06F 3/1285* (2013.01); *G06F 21/608* (2013.01); *H04L 9/0897* (2013.01); *H04L 9/3247* (2013.01); *H04L 63/0853* (2013.01); *H04N 1/444* (2013.01); *H04N 1/4413* (2013.01); *G06F 2221/2141* (2013.01); *H04L 63/062* (2013.01); *H04N 2201/0094* (2013.01)

(58) Field of Classification Search
CPC .... G06F 3/1222; G06F 3/1238; G06F 21/608; G06F 3/1285; H04N 1/4413; H04N 1/444; H04L 9/3247
USPC ....................................... 358/1.14
See application file for complete search history.

(56) References Cited

U.S. PATENT DOCUMENTS 7,237,114 B1   6/2007  Rosenberg
8,014,013 B2   9/2011  Owen et al.
(Continued)

FOREIGN PATENT DOCUMENTS

WO    WO-2013062531 A1    5/2013

OTHER PUBLICATIONS

International Search Report & Written Opinion receive in PCT Application No. PCT/US2013/050074, Apr. 28, 2014, 13 pages.
(Continued)

Primary Examiner — Allen H Nguyen
(74) Attorney, Agent, or Firm — HP Inc. Patent Department

(57) ABSTRACT

A printer includes an access module to control access among different participants, one participant at a time, to at least some encrypted parts of a composite document print job located at the printer.

15 Claims, 5 Drawing Sheets

(56) References Cited

U.S. PATENT DOCUMENTS

| | | | |
|---|---|---|---|
| 8,856,532 B2* | 10/2014 | Boyer | G06F 21/64 |
| | | | 707/690 |
| 9,280,672 B2* | 3/2016 | Manchala | G06F 21/608 |
| 2007/0050696 A1 | 3/2007 | Piersol et al. | |
| 2009/0019526 A1* | 1/2009 | Fukushima | H04L 12/1822 |
| | | | 726/3 |
| 2009/0125360 A1* | 5/2009 | Ito | G06Q 10/0633 |
| | | | 705/7.27 |
| 2010/0024011 A1* | 1/2010 | Fukuoka | G06F 17/30011 |
| | | | 726/5 |
| 2010/0043070 A1 | 2/2010 | Okada et al. | |
| 2012/0185701 A1 | 7/2012 | Balinksy et al. | |
| 2012/0191983 A1 | 7/2012 | Simske et al. | |
| 2012/0198237 A1 | 8/2012 | Balinsky | |
| 2012/0243010 A1 | 9/2012 | Aihara | |
| 2012/0278631 A1 | 11/2012 | Balinsky et al. | |
| 2013/0031366 A1* | 1/2013 | Simske | H04L 9/0825 |
| | | | 713/168 |

OTHER PUBLICATIONS

Rahaman, M.A. et al., Distributed Access Control for XML Document Centric Collaborations, (Research Paper), 12th International Conference IEEE Enterprise Distributed Object Computing, Sep. 15-19, 2008, pp. 267-276.

* cited by examiner

| | A | B | C | F | G |
|---|---|---|---|---|---|
| | PART | PART | PART | PART | PART |
| 111 WORKFLOW PARTICIPANT | $V_A D_A E_A S_A$ (MODIFY) | $V_B$ (VALIDATE) | $V_C D_C$ (READ ONLY) | $V_F D_F E_F S_F$ (MODIFY) | $V_G$ (VALIDATE) |
| 112 WORKFLOW PARTICIPANT | $V_A$ (VALIDATE) | $V_B D_B E_B S_B$ (MODIFY) | $V_C$ (VALIDATE) | $V_F$ (VALIDATE) | $V_G D_G$ (READ ONLY) |
| 113 WORKFLOW PARTICIPANT | $V_A$ (VALIDATE) | $V_B$ (VALIDATE) | $V_C$ (VALIDATE) | $V_F D_F E_F S_F$ (MODIFY) | $V_G$ (VALIDATE) |

PRINTING COMPOSITE DOCUMENTS

BACKGROUND

With the advent of the information age, the volume of documents that have been created, stored, and communicated has grown dramatically, while the complexity and variety of different types of documents has experienced equally robust growth. Furthermore, documents are often no longer used as unitary elements that are native to their specific formats. Instead, a typical use, e.g. a presentation, often involves using documents of a variety of different formats e.g. portable document file, word processor file, spreadsheet file, slide presentation file, portable audio file, video file, etc. These documents can be gathered together to represent a collection of documents, which is sometimes referred to as a composite document. The secure creation, management, use, monitoring and disposal of such documents are a significant part of enterprise document lifecycles.

DETAILED DESCRIPTION

Figure 1:
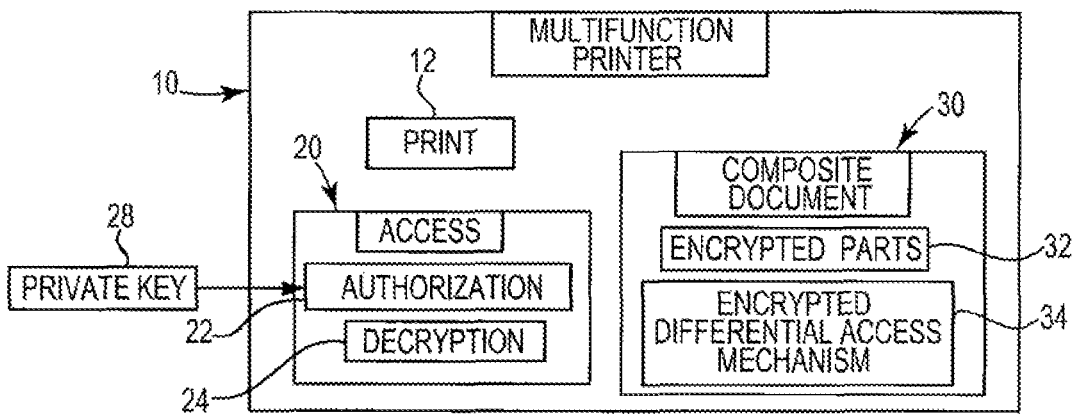
FIG. 1 is a block diagram schematically illustrating a printer, according to one example of the present disclosure.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense.

At least some examples of the present disclosure facilitate handling of composite documents at a multifunction printer. In some examples, a multifunction printer (MFP) is also known as an all-in-one (AiO) or a multifunction device (MFD). In some examples, a multifunction printer is any device that includes a printer and a scanner and that can print, scan, and copy with some being able to FAX.

In some examples, a multifunction printer includes an access module to control access among different participants, one participant at a time, to at least some encrypted parts of a composite document print job located at the multifunction printer. In some examples, the access module includes an authorization function and a decryption function. In one aspect, the authorization function receives, generally contemporaneous with a physical presence of a respective participant at the printer, a private key associated with the respective participant. In one aspect, the decryption function enables attempting decryption, via the private key in coordination with an encrypted differential access mechanism embedded within the composite document, of at least one encrypted part associated with the respective participant. Upon successful decryption, the access module releases the decrypted part(s) in the presence of the respective participant. A print mechanism prints the decrypted part.

In some examples, an attempt of a non-participant or a participant with an invalid key or corrupt key to access a composite document will result in a failure to decrypt any part of, the composite document and will be reported to that user as some form of access denied.

In general terms, via at least some examples of the present disclosure, this arrangement creates an environment, in which secure differential access is provided at a multifunction printer among multiple users (e.g. authorized workflow participants) to enable printing of select parts (to which a particular user has been granted access) of a composite document.

One illustrative example of employing differential access to (and enabled by) a composite document at a multifunction printer includes providing payroll documentation for a group of employees, such as an entire department of a company. In this example, the payroll documentation for a group of employees is packaged as a single composite-document print job. In one aspect, in order to protect the sensitive and personal information via the composite document, the payroll documentation is transmitted and stored in an encrypted form. In one aspect, such encryption is provided, at least partially, via an encrypted differential access mechanism embedded within the composite document. In use, once the payroll documentation (within the composite document) is securely present at the multifunction printer, an employee goes to the multifunction printer to access and print their payroll documentation, such as a paystub and cover letter.

In this arrangement, each paystub corresponds to a part (one native format application) of a composite document to which just one participant has been granted access. To maintain confidentiality, the paystubs are not shared among multiple participants. On the other hand, other parts of the composite document, such as a payroll cover letter, can be shared (i.e. accessible by) with every participant. In some instances, the payroll cover letter is provided in a different native format application than the native format application of the paystub.

In addition, in some instances, the payroll documentation further includes an explanatory letter, such as might be provided to new employees (but not other employees) unfamiliar with the policies of the payroll department or such as might be provided to aid in interpreting notations on the paystub.

With this situation in mind, a composite document according to at least some examples of the present disclosure securely contains all the files and documents of the payroll documentation as a single document file having at least some encrypted parts. The composite "payroll documentation" document also includes an encrypted differential access mechanism to ensure that each participant is granted access solely to the particular different parts of the payroll documentation (to which access is granted).

In one aspect, this arrangement leverages and extends the ability of a composite document, such as a publicly-posted composite document (PPCD), to operate and be communicated securely within generally non-secure channels and/or among non-secure documents. In another aspect, a multifunction printer is adapted to complement and further enable the security features and attributes (e.g. multiple level, fine-grained differential access) of publicly-posted composite documents (PPCDs) without disrupting the otherwise traditional features and functions of the multifunction printer.

In contrast, traditional document systems typically involve transmitting or creating separate document for each separate item to be printed at a printer and typically use more cumbersome security precautions. In an example of printing separate paystubs and associated documentation (e.g. cover letter, etc.) for an entire department of a company, traditional systems would include sending a batch of entirely separate documents to a printer with no provision being made for how or when an individual participant could print their confidential information in a way that no one else has access to it or can see it. On the other hand, via at least some examples of the present disclosure, each participant can print their own confidential documents at a time convenient for them to be a printer to immediately receive and control the documents. In addition, because their information is provided within the structure of a composite document, information originating from different native format applications (for that participant) can be printed in a single print/access request such that the participant need not fuss with having to print several separate documents.

Moreover, whether through variable data printing techniques or not, providing multiple documents in the traditional systems is significantly less efficient and less secure than the transmission and handling of a single composite document in accordance with at least some example of the present disclosure. At least some examples of the present disclosure provide for restricting access to individual parts of the composite document to different workflow participants (i.e. having different roles in the workflow) as dictated by business logic, while also retaining the overall integrity of materials involved in a "single file document, such that no missing parts and/or broken links exist when the "single file document" is accessed by those having at least some level of supervisory control (e.g., power users, managers, decision makers, etc.) over the composite document.

At least some examples of the present disclosure provide for a participant being able to print several items from a composite document (e.g. a PPCA) via one print call, as opposed to being forced to print each item as a separate entity as might occur in traditional systems.

At least some examples of the present disclosure enable authorized participants to be limited to print their parts at certain stages of a document workflow. In one aspect, this arrangement streamlines a workflow and ensure, for example in one situation, that a participant is limited to printing the document until after previous workflow participants have made engaged (i.e. accessed, modified, printed, etc.) the composite document(s) according to their respectively assigned roles in the workflow.

Accordingly, these examples, and additional examples, are further described and illustrated in association with at least FIGS. 1-10.

FIG. 1 is a block diagram schematically illustrating a multifunction printer, according to one example of the present disclosure. As shown in FIG. 1, the multifunction printer 10 includes a print mechanism 12 and an access module 20. In general terms, the access module 20 controls access among different participants, one participant at a time, to at least some encrypted parts of a composite document 30 (as a print job) present at the multifunction printer 10. In one aspect, the composite document 30 arrives at, and is handled by, multifunction printer 10 through various means, which are later described in more detail. In another aspect, the access module 20 implements at least a portion of a composite-document access protocol, as further described later in association with at least FIG. 9A.

In some examples, some participants are granted to access to at least some of the same encrypted parts to which other participants are granted access. In some examples, some participants are granted sole access to encrypted parts to which other participants are not granted access.

In some examples, the access module 20 includes an authorization function 22 and a decryption function 24, as shown in FIG. 1. In one example, the authorization function 22 receives, generally contemporaneous with a physical presence of a respective participant at the printer 10, a private key 28 associated with the respective participant. In one aspect, via this association the private key 28 is provided to (and usable) solely by a single respective participant to ensure that each participant gains access to items and solely to those items (parts of a composite document) to which the participant has been granted access. None of participants are able to elevate their rights and gain access to parts for which they have not been granted access. In some examples, the private key 28 is in encrypted form prior to its deployment at the multifunction printer 10. Further details regarding the private key 28 are described later.

Moreover, various means of receiving the private key 28 at multifunction printer 10 are described later in further detail, such as in association with at least FIG. 7A-7B.

In one example, the decryption function 24 of access module 20 attempts decryption, via the private key 28 in coordination with an encrypted differential access mechanism 34 embedded within the composite document 30, of at least one encrypted part 32 associated with the respective participant. In one aspect, via this association, at least some encrypted parts 32 of the composite document are accessible solely by a single respective participant (or select number of participants) and not generally available to other participants. Further details regarding such differential access are described later.

Upon successful decryption, the access module 20 releases the decrypted part(s) for printing in the presence of the respective participant via print mechanism 12 (Le, a printing pipeline).

In some examples, in general terms the multifunction printer 130 includes a device capable of at least performing printing (via print mechanism 12) and in some instances, performing additional functions such as copying, faxing, or scanning.

In some examples, at least the authorization function 22 and decryption function 24 operate independent of, and separate from, an external server (such as a traditional policy server for administering or managing encryption keys). Instead, in cooperation with a supplied private key 28, a combination of the access module 20 and the differential access mechanism 34 embedded within the composite document 30 accomplish the secure handling of the composite document and providing differential access to at least some parts of the composite document among different participants.

Figure 2:
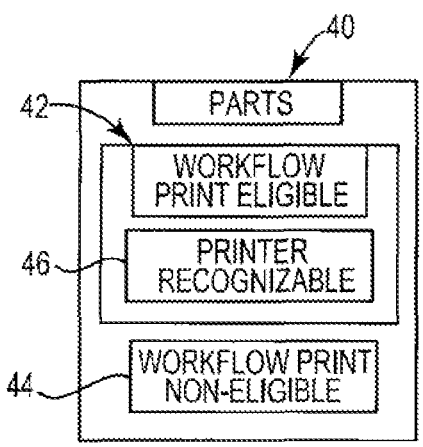
FIG. 2 is a block diagram schematically illustrating example pails of a composite document, according to one example of the present disclosure.

FIG. 2 is a block diagram schematically illustrating parts 40 of a composite document 30, according to one example of the present disclosure. In at least some examples of the present disclosure, and as shown in FIG. 2, parts 40 of the composite document include at least a workflow print eligible part 42 and a workflow print non-eligible part 44. In general terms, each workflow print eligible part 42 corresponds to a printer recognizable file format 46, i.e. a file format that the multifunction printer 10 is equipped to recognize and handle. In some examples, the workflow print eligible part(s) 42 of a composite document 30 include, but are not limited to, at least one of a printable format of a text file, some image files (e.g. JPEG, PNG, etc.) or a printable format (e.g. a portable document format (PDF) file, a Printer Command Language (PCL) file, a Postscript (PS) file, etc.) of a word processor file, a slide presentation file, a spreadsheet file, etc. In one aspect, being in a printable format includes the particular type of file (e.g. word processing file) being converted via a corresponding print driver into a format recognizable by a printer, thereby producing a print-eligible part 42. Each of these different types of workflow print eligible part(s) 42 (prior to conversion via a print driver) corresponds to, and originates from, a different native format application. With reference to at least FIGS. 1-2, in some examples, composite document 30 comprises a publicly-posted composite document (PPCD), such as those composite documents described in *Differential Access for Publicly-Posted Composite Documents with Multiple Workflow Participants*, (Proceeding, Doc Eng'10, Proceedings of the 10$^{th}$ ACM Symposium on Document Engineering, Pages 115-124, ACM, New York, N.Y. © 2010).

In general terms, with further reference to FIG. 2, the workflow print non-eligible part(s) 44 of the composite document 30 are not printable at the multifunction printer 10 (at least for the particular state in which the composite document 30 arrives at the multifunction printer 10) and need not have a file format recognizable by the multifunction printer 10. Accordingly, the workflow print non-eligible part(s) 44 are generally unrestricted regarding their file format. Nevertheless, workflow print non-eligible parts 44 can be handled by the multifunction printer 10 because they form part of the composite document 30.

Figure 3:
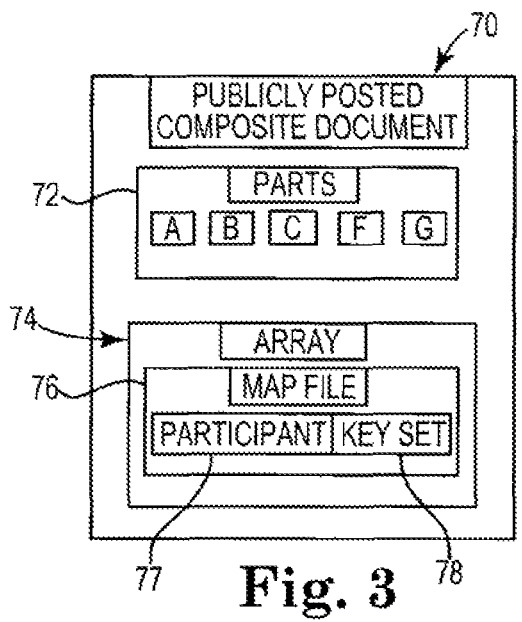
FIG. 3 is a block diagram schematically illustrating at least some components of a publicly-posted composite document, according to one example of the present disclosure.

In some examples, as shown in FIG. 3, the composite document 30 (in FIG. 1) comprises a publicly-posted composite document (PPCD) 70. As further shown in FIG. 3, the composite document includes different parts 72 and an array 74 of map-files 76 with at least one map-file 76 for each participant in a workflow associated with the composite document. In another aspect, each map-file 76 includes a keyset 78 corresponding to the level of access assigned to a particular participant 77 for particular parts (A, B, C, F, G, etc.)

Figure 4:
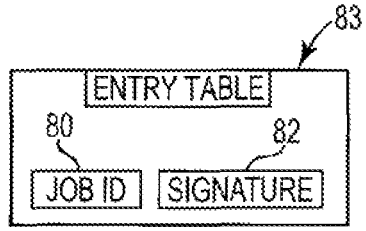
FIG. 4 is a block diagram schematically illustrating at least some components associated with a publicly-posted composite document, according to one example of the present disclosure.

In some examples, as shown in FIG. 4, each composite document 30 (such as, but not limited to, a PPCD 70) includes a job identifier 80 and signature 82 to ensure that execution of printing parts of a composite document (such as a composite document 30) is limited to authorized print jobs. In one aspect, a job identifier 80 and signature 82 form part of an entry table 83 embedded within the composite document 30 (such as, but not limited to, a PPCD 70). In some examples, the entry table 83 provides a fast filtration mechanism to identify a user's map file without exposing the users identity. In one aspect, a part of the entry table 83 is encrypted and decryptable via a private key 28 of a workflow participant (e.g. FIG. 1). Upon decryption of the entry table 83, a map-file associated with the private key corresponding to a participant is identified and the recovered secret key is further applied to that map file for decryption to obtain the key set 78 for a particular participant and parts 72 to which the participant is granted access. One example of implementing an entry table is described in *Differential Access for Publicly-Posted Composite Documents with Multiple Workflow Participants*, (Proceeding, Doc Eng'10, Proceedings of the 10$^{th}$ ACM Symposium on Document Engineering, Pages 115-124, ACM, New York, N.Y. © 2010).

Figures 5, 6:
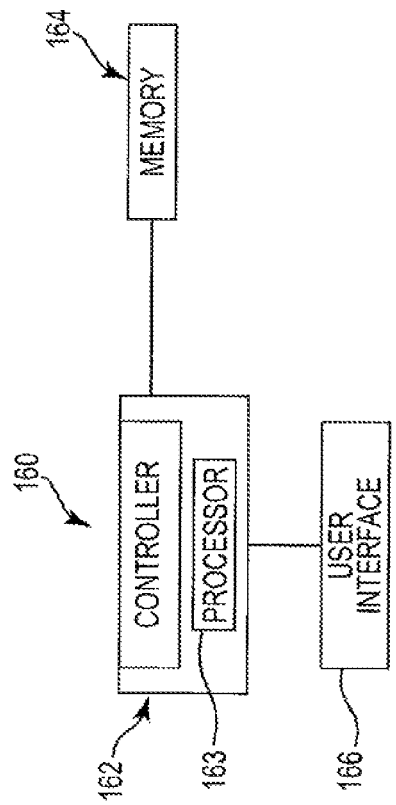
FIG. 5 is a block diagram schematically illustrating a table regarding differential access to at least some parts of a composite document, according to one example of the present disclosure.
FIG. 6 is a block diagram schematically illustrating a control portion, according to one example of the present disclosure.

FIG. 5 is a block diagram schematically illustrating a table 120 that at least partially defines a differential access mechanism 34 (which itself is encrypted) to provide differential access among multiple workflow participants to at least some encrypted parts 32 of the composite document 30, according to one example of the present disclosure. As shown in FIG. 5, in some examples, table 120 includes rows 122 listing different workflow participants 111, 112, 113 and columns 124 listing different parts (A, B, C, F, and G) of a composite document 30. In general terms, table 120 represents one example of the manner in which map-files 76 establish the differential access that the workflow participants 111, 112, 113 are granted to various part(s) (A, B, C, F, and G) of the PPCD 70.

As shown in the Table 120 of FIG. 5, in one example, the keys available to form the keyset 78 include an encryption key (E), a decryption key (D), a signature key (5), and a verification key (V). In one aspect, the verification key (V) allows authenticity of a part of a composite document to be verified without providing access to the content parts of the composite document.

In some examples, each individual part (Pi) of the composite document 30 is assigned its own set of keys (Vi, Di, Ei, Si), where the variable i represents a designation of one of several different parts (A, B, C, F, G). With its own set of keys (Vi, Di, Ei, Si), each part (e.g. A, B, C, F, G) can be encrypted, decrypted, signed, and/or verified individually (i.e. separately from other parts of the composite document 30). For each part of the composite document 30, the subset of the four potential available keys that are assignable to a particular participant are placed in this participant's map-file 76 (FIG. 3) depending upon the level of access granted to that particular participant for particular parts of the composite document 30.

For example, consider a workflow participant 111 (represented in Table 120 of FIG. 5) to which a Modify (i.e.

Read/Write) access is granted to participant 111 for parts A and F of a composite document 30, to which a Validate access is granted to participant for Parts B and G, and to which a Read Only access is granted to participant 111 for Part C.

With this arrangement in mind, to grant a Modify access for part A to participant 111, the keys Va, Da, Ea, Sa are assigned. Similarly, in order to grant a Modify access to participant 111 for part F, the participant 111 is given keys: Vf, Df, Ef, Sf, as shown in FIG. 5. On the other hand, to be granted a Validate access for Parts B and G, respectively, the participant 111 is given a Validation key Vb and Vg, respectively, as shown in FIG. 5. Finally, to be granted Read Only access for Part C, participant 111 is given a Validation key Vc and a Decryption key Dc. In one aspect, all these assigned keys (Va, Da, Ea, Sa, Vb, Vc, Dc, Vf, Df, Ef, Sf, and Vf) are placed in the key map-file 76 (FIG. 3) assigned to workflow participant 111.

It will be understood that the other example workflow participants 112, 113 also have their own unique key map-file 76 (FIG. 3) containing the keys corresponding to the types of access granted (to that particular workflow participant) to various parts of the composite document. For example, workflow participant 113 would have a key map-file 76 containing the following keys: Va, Vb, Vc, Vg, and Vf, Of, Ef, Sf, as shown in Table 120 of FIG. 5. In one aspect, the keys in this example key map-file 76 corresponds to a Validate access for parts A, B, C, and G and a Modify (i.e. Read/write) access for Part F. A similar demonstration can be made for workflow participant 112.

In one aspect, it will be understood that for a user having a Modify Access status to a particular part, the keys are applied in a particular order, proceeding with application of the validation key (Vi) first, followed by decryption via key Di to permit modifying the decrypted part, and then encryption via key Ei, and completion with key Si to sign the encrypted part. For a user having a Read Only Access status to a particular part, keys Vi and Di are also applied in order, with key Vi applied first to validate and then with key Di applied to decrypt the pertinent part of the composite document to allow the user to access and read the part of the composite document. Finally, for a user having a Validate Access status to a particular part, just the validate key Vi is applied for use in verifying the part's signature.

As shown in FIG. 5, in some instances, several participants (e.g. 111, 113) are granted the same level of substantive access (e.g. MODIFY) to the same part (e.g. part F). In some instances, just one participant (e.g. 111) is granted substantive access to a given part (e.g. part C) while the other participants merely have Validate-type access.

Moreover, in some examples, a given participant (e.g. 111) has been granted substantive access to more than one part (e.g. pads A, C, and F) with one of those parts (e.g. part C) being read-only access. On the other hand, a Modify-type access has been granted to participant 111 regarding the other two parts (e.g. parts A and F).

It will be understood that Table 120 provides just one example of different combinations of access granted to various participants among various parts of a composite document. Moreover, as noted above, in some examples, each part comprises a portion of a single file or a whole file. In some examples, each part comprises portions of different files within the composite document.

With this in mind, it will be note that the actual contents of a composite document 30 (e.g. PPCD 10) can include many separate files and documents. The contents are divided into parts according to access granted according to the workflow in which individual files and/or file fragments that are to be assigned the same access control are combined into content-parts. Each content part is encrypted individually, such that the keys are different for every part, and can be accessed separately from other content parts. All individual files and fragments comprising one (access or content) part are accessible simultaneously. If a few different files or fragments in a particular document workflow necessitate different access—then they are placed into different parts.

Prior to describing further examples regarding the manner in which decryption and differential access will be implemented at the multifunction printer 10 (FIG. 1), additional components of multifunction printer 10 will be described.

With this in mind, FIG. 6 is a block diagram schematically illustrating a control portion 160, according to one example of the present disclosure. In some examples, control portion 160 includes a controller 162, a memory 164, and a user interface 166. In some examples, the control portion 160 forms a part of the multifunction printer 10 (FIG. 1) with memory 164 functioning as the memory (or part of a memory) of the multifunction printer 10.

In addition, the user interface 166 provides one mechanism to at least partially implement the access module 20. In some examples, user interface 166 includes, but is not limited to, a control panel of the multifunction printer 100.

In general terms, controller 162 of control portion 160 comprises at least one processor 163 and associated memories that are in communication with memory 164 to generate control signals directing operation of at least some components of the systems and components described throughout the present disclosure. In some examples, these generated control signals include, but are not limited to, handling a composite document print job at a multifunction printer.

In one aspect, in response to or based upon commands received via a user interface 166 and/or machine readable instructions (including software), controller 162 generates control signals to at least partially implement the handling of composite document at the multifunction printer in accordance with at least some of the previously described examples and/or later described examples of the present disclosure, in one example, controller 162 is embodied in the multifunction printer 10, while in other examples, controller 162 is embodied in a general purpose computer in communication with the multifunction printer 10.

For purposes of this application, in reference to the controller 162, the term "processor" shall mean a presently developed or future developed processor (or processing resources) that executes sequences of machine readable instructions (such as but not limited to software) contained in a memory. In some examples, execution of the sequences of machine readable instructions, such as those provided via memory 164 of control portion 160 cause the processor to perform actions, such as operating controller 162, gathering user credentials and obtaining a private key, deploying an encrypted differential access mechanism 34, and/or printing decrypted parts of the composite document 30, as generally described in (or consistent with) at least some examples of the present disclosure. The machine readable instructions may be loaded in a random access memory (RAM) for execution by the processor from their stored location in a read only memory (ROM), a mass storage device, or some other persistent storage (e.g., non-transitory tangible medium or non-volatile tangible medium), as represented by memory 164. In one example, memory 164 comprises a computer readable tangible medium providing non-volatile storage of the machine readable instructions executable by a process of controller 162. In other examples, hard wired circuitry may be used in place of or in combination with machine readable instructions (including software) to implement the functions described. For example, controller 162 may be embodied as part of at least one application-specific integrated circuit (ASIC). In at least some examples, the controller 162 is not limited to any specific combination of hardware circuitry and machine readable instructions (including software), nor limited to any particular source for the machine readable instructions executed by the controller 162.

With these examples in mind, it will be apparent that in some examples at least some portions of control portion 160 can be embodied as firmware of multifunction printer 10. In some examples, at least some portions of access module 20 of multifunction printer 10 are embodied in the firmware of the printer 10. In some examples, memory 164 includes such firmware.

In some examples, user interface 166 comprises a user interface (such as a control panel or other display-based control mechanism) that provides for the simultaneous display, activation, and/or operation of at least some of the various components, functions, features, and of control portion 160, a multifunction printer 10, and/or other workflow resources, as described throughout the present disclosure. In some examples, at least some portions or aspects of the user interface 166 (including but not limited to a control panel) are provided via a graphical user interface (GUI). In some examples, as previously noted the user interface 166 incorporates or embodies access module 20 through which a user accesses jobs to print.

Moreover, it will be understood that the features, functions, modules, and components of the composite document 30 and associated workflow modalities, such as multifunction printer (e.g. multifunction printer 10 in FIG. 1), as described throughout the disclosure can be arranged in different forms and groupings, and therefore the composite document (FIG. 1) and various modalities (e.g. multifunction printer 10 in FIG. 1) are not strictly limited to the particular arrangement or groupings of functions, modules, and components illustrated in FIGS. 1-10.

Figure 7A:
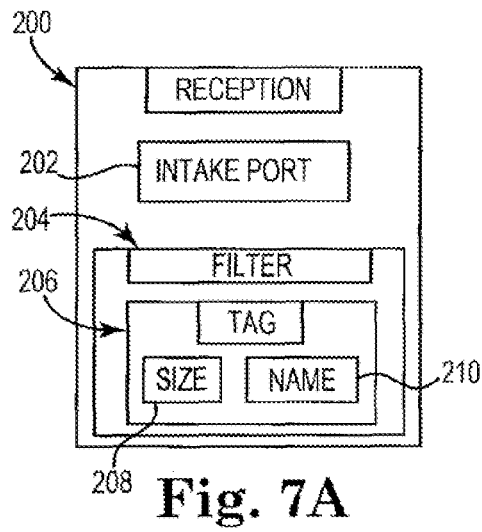
FIG. 7A is a block diagram schematically illustrating at least some components of a reception module of a multifunction printer, according to one example of the present disclosure.
Figure 7B:
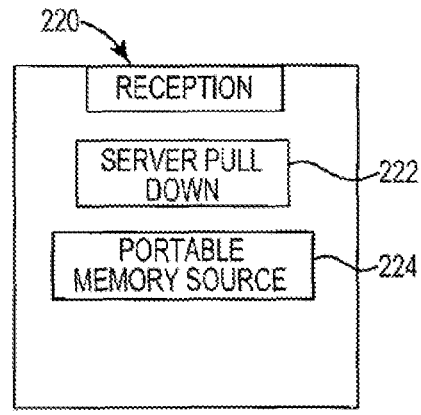
FIG. 7B is a block diagram schematically illustrating at least some components of a reception module of a multifunction printer, according to one example of the present disclosure.
Figure 7C:
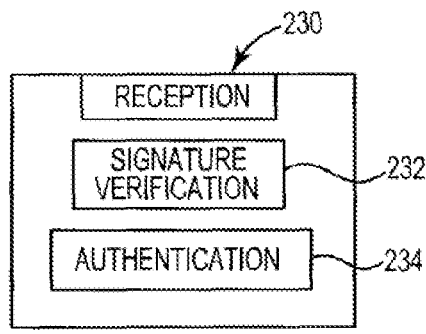
FIG. 7C is a block diagram schematically illustrating at least some components of a reception module of a multifunction printer, according to one example of the present disclosure.
Figure 8:
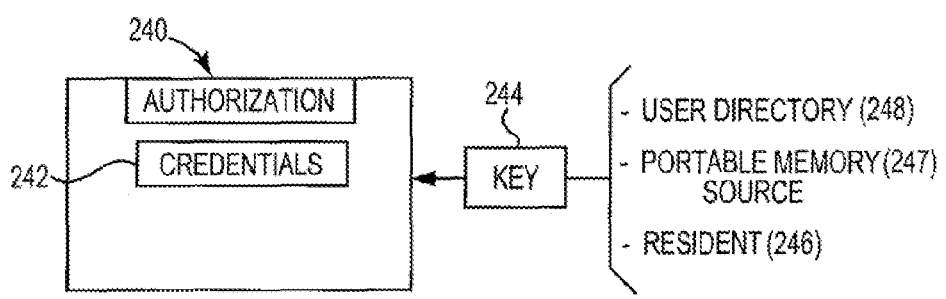
FIG. 8 is a block diagram schematically illustrating at least some components of an authorization function of a multifunction printer, according to one example of the present disclosure.

As described in association with at least FIGS. 7A-8, further examples are now provided regarding how the composite document 30 and/or how the private key 28 arrives at, or is already present at, the multifunction printer 10. FIG. 7A is a block diagram of a reception module 200 of a multifunction printer 10, according to one example of the present disclosure. In one example, the reception module 200 is a component in addition to the features and attributes of the multifunction printer 10 previously described in association with at least FIG. 1. As shown in FIG. 7A, the reception module 200 includes a printer port 202 and a filter module 204. The intake port 202 acts as an intake communication port for receiving incoming print jobs and in some examples, the intake port comprises a standard printer port, such as a 9100 port. In some examples, the intake port 202 comprises a port monitor when a Web Services for Devices (WSD) printer is employed. In some examples, the intake port 202 comprises a TCP/IP port.

In one aspect, despite the non-traditional structure and features (e.g. encrypted portions) of the composite document 30, a tag 206 and associated features in the multifunction printer 10 (in accordance with at least some examples of the present disclosure) enable the intake port 202 to receive the composite document 30 in generally the same manner as traditional print jobs.

In another aspect, in some examples the intake port 202 of the multifunction printer is a non-encrypted communication channel (such as Printer Job Language/Printer Description Language (PJL/PDL) Data Stream over TCP/IP) because the composite document 30 is already secure via its own encryption scheme and mechanisms. With further reference to FIG. 7A, when a composite document 30 (such as a publicly-posted composite document, PPCD 70) including a tag 206 arrives at the multifunction printer 130, the filter module 204 performs initial handling of the incoming Print Job Language (PJL) job containing the composite document 30 by sorting the composite-document-type files from other types of files. In one example, the filter module 204 comprises an I/O filter dedicated to handling composite-document formatted jobs. In some examples, this initial handling includes the filter module 204 authenticating the composite document 10.

Accordingly, upon receiving a tagged composite-document print job 10, the filter module 204 detects the tag 206, and directs the composite document 30 to be stored in a dedicated memory portion (such as a portion of memory 164 in FIG. 6) instead of being printed (as would otherwise typically occur for an incoming traditional print job at a traditional multifunction printer). In one aspect, the dedicated memory portion (of memory 164) is a restricted access directory, which is not accessible unless a user is authenticated via the access module 20 (FIG. 1) as further described later.

In one aspect, in handling the composite document 30, the filter module 204 retrieves (from the input stream) the amount of bytes specified by the SIZE parameter 208 of tag 206 and stores the retrieved data in the dedicated memory portion (e.g. a portion of memory 164 of FIG. 6) of the multifunction printer 10.

In another aspect, via the filter module 140 of multifunction printer 10, the NAME parameter 210 of tag 206 is used to determine the name of the file stored. If a file with the same name already exists in dedicated memory portion (within memory 164 shown in FIG. 6), then a version control scheme is applied to avoid overwriting the previously stored job. In one aspect, once the composite document 30 is at the multifunction printer 10, the tag 204 retains, at least, the name parameter 210 (e.g. @PJL PPCD NAME) to enable the users to recognize their job amongst other stored ones.

In general terms, the tag 206 enables a multifunction printer 10 to handle the composite document 30 to facilitate its storage, access, etc. In some examples, a document manager or document generation system that creates the composite document 30 also creates tag 206 and appends it onto the composite document 30 so that the composite document 30 will be recognizable relative to, and distinct from, other incoming non-composite-document print jobs. In one aspect, this arrangement can be viewed as a composite document print job being defined by, at least, a composite document embedded within a PJL wrapper having identifying information, such as tag 206.

In one example, to create the tag 206, the size of the job is computed in bytes (242688 in the example below) and a job name is determined, such as "ppcd_job_name.pex". In one aspect, the job name is selected by an operator or automatically generated.

In some examples, with information about the size parameter 208 and name parameter 210, the tag 206 is created as a part of a Printer Job Language (PJL) job including the dedicated command, e.g. @PJL PPCD %-12345X @PJL PPCD SIZE=242688 NAME="ppcd_job_name.pex".

After the tag is constructed, the binary data of the PPCD job is appended to the same file immediately after the tag 206, such as the above-noted dedicated printer job language (PJL) command.

With this arrangement in mind, in some examples, the incoming composite document print job 30 with tag 206 is specified via. Printer Job Language (PJL) in the following manner:

```
<ESC>%-12345X@PJL<CR><LF>
@PJL JOB NAME="PPCD JOB"<CR><LF>
@PJL_PPCD FORMAT:BINARY SIZE=int
NAME=pathname<CR><LF><binary data>
@PJL EOJ NAME= "End of PPCD JOB"<CR><LF>
<ESC>%-12345X.
```

With these arrangements in mind, the filter module 204 enables the multifunction printer 10 to receive a composite document print job along with other traditional print jobs, while providing a basis to sort composite document print jobs from other traditional print jobs.

FIG. 7B is a block diagram schematically illustrating a reception module 220 of multifunction printer 10, according to one example of the present disclosure. In general terms, reception module 220 includes some other intake pathways by which a composite document is received at multifunction printer 10.

In some examples, the intake pathways include a server pull down function 222 to enable retrieving the composite document from a server accessible by the multifunction printer 10. In some examples, the intake pathways of reception module 220 include a portable memory source function 224 to enable receiving the composite document 30 via a portable memory source, such as a USB memory device external to the multifunction printer 10, by which the participant brings the composite document 30 directly to the multifunction printer 10 to access and/or print portions of the composite document 30. In some examples, the USB memory device becomes operably connected and in communication with the reception module 220 via a USB port of the multifunction printer 10.

In some examples, the reception module 220 forms part of and/or incorporates the features and attributes of reception module 200, as previously described in association with FIG. 7A.

Accordingly, as described in association with FIGS. 7A-7B, a composite document 30 (such as a PPCD 70) can arrive at a multifunction printer 10 through various intake pathways. In some examples, these intake pathways include, but are not limited to, receiving the composite document through an intake/printer port, via a portable memory device (e.g. USB storage device or SmartCard), or via download from a server.

In one aspect, once the composite document 30 arrives at the multifunction printer 10, in some examples, further determinations are made regarding whether the multifunction printer will accept and retain composite document 30 for further processing or instead the composite document 30 will be discarded because of some deficiency regarding the authenticity or other features of the composite document.

FIG. 7C is a block diagram schematically illustrating a reception module 230 that forms part of the multifunction printer 10, as previously described in association with FIGS. 1-7B, according to one example of the present disclosure.

As shown in FIG. 7C, in some examples, the reception module 230 includes a signature verification function 232.

In one example, prior to storing a composite document 30 in a dedicated memory portion (of memory 164), via the signature verification function 232 the system verifies (for each part of the composite document 30) the authenticity of the document signature and the certification chain on the signature verification key certificate. If the signature or certificate cannot be found, if the signature verification fails, or if the certification chain omits a trusted/authorized root certificate authority (or if the certificate is not in an authorized list), then the composite document 30 is automatically discarded for not being authentic. In some examples, a notification regarding the status regarding verification is sent to a document manager or entered into a log associated with the composite document 30.

In some examples, authenticity of a composite document 30 (such as a PPCD) is immediately verified because each composite document (e.g. PPCD) is signed. In some examples, submission of the composite document(s) is limited to authorized personnel such that the composite document is signed by known signature keys belonging to those authorized personnel. In one aspect, unsigned documents or documents signed by non-authorized personnel are discarded without being stored in the multifunction printer 10.

As further shown in FIG. 7C, in some examples, the reception module 230 includes an authentication function 234. In general terms, the authentication function 234 enables verifying an order, and authenticity of, signature parameters of each part of a plurality of parts of the composite document according to the standard procedure to establish authenticity of the composite document (which is performed by every workflow participant on receiving a composite document, e.g. a PPCD document). In one aspect, the authentication function 234 operates in conjunction with, at least, the access protocol at 282 in FIG. 9.

In some examples, the reception module 230 (FIG. 7C) forms part of and/or incorporates the features and attributes of reception module 200 (FIG. 7A) and/or reception module 220 (FIG. 7B).

Having described how a composite document 30 might arrive at the multifunction printer 10 and/or that a composite document is authenticated upon its arrival (in some examples), further details are now provided on how to determine that the correct participant (an authorized participant) is present at the multifunction printer 10, and how the multifunction printer 10 receives the private key, which is one of several tools used to gain access to encrypted portions 32 (FIG. 1) of composite document 30 to be printed at the multifunction printer 10.

FIG. 8 is a block diagram schematically illustrating an authorization module 240 of an access module of a multifunction printer, according to one example of the present disclosure. In some examples, the authorization module 240 is incorporated within and/or complements the authorization function 22 of access module 20, as previously described in association with FIG. 1.

In general terms, the authorization module 240 includes a credentials function 242 to receive user input (at a control panel of the multifunction printer) and determine whether a user is authorized to access a private decryption key, which can lead to access and deployment of additional keys to ultimately provide access to at least some encrypted parts 32 of composite document 30. In some examples, user authorization is tested by challenging the participant to supply credentials such as username and password or personal identification number (PIN) as part of a login 256 or biometric credentials, or other forms of authentication.

Upon successful authorization, the credentials function 242 receives the private key 244 from a resource. In some examples, the credentials function 242 of the authorization module 240 prompts a user to select a resource from which the private key will be obtained in order to ultimately gain access to selected document or a group of documents in the multifunction printer 10/Accordingly, at least some of the selectable resources via which the private key can be accessed are described below. In some examples, the selectable resource (at which the private key is stored) already resides (e.g. resident 246) or internal within the multifunction printer 10, i.e. being stored locally within a memory (e.g. in the dedicated key store of local hard drive) of the multifunction printer 10. In some examples, the resource (at which the private key 244 is stored and accessed) comprises a removable memory source 247, such as a USB storage device receivable via a USB port of the multifunction printer 10, Smart Card readable by a smart card reader of the multifunction printer 10, etc. from which the private key 244 can be directly accessed locally at the multifunction printer 10. In some examples, the locally accessible resource (e.g. USB storage device) employs identity assurance tools, such as those available under the trade name ActivIdentity from HID Global of Irvine, Calif.

In some examples, the resource (via which the private key is fetched) comprises a user directory 248, such as a Lightweight Directory Access Protocol (LDAP) server in communication with the multifunction printer, which provides the private key 244 to multifunction printer 10.

In some examples, the resource (via which the private key is fetched) comprises a cloud/service based user identity service.

With these arrangements in mind, attention is now directed to the access module 20 (FIG. 1) leverages the encryption of parts 32 and the differential access mechanism (of the composite document 30) to selectively enable a participant at the multifunction printer 10 to access portions of the composite document 30 to which they are granted access.

Figures 9A, 9B:
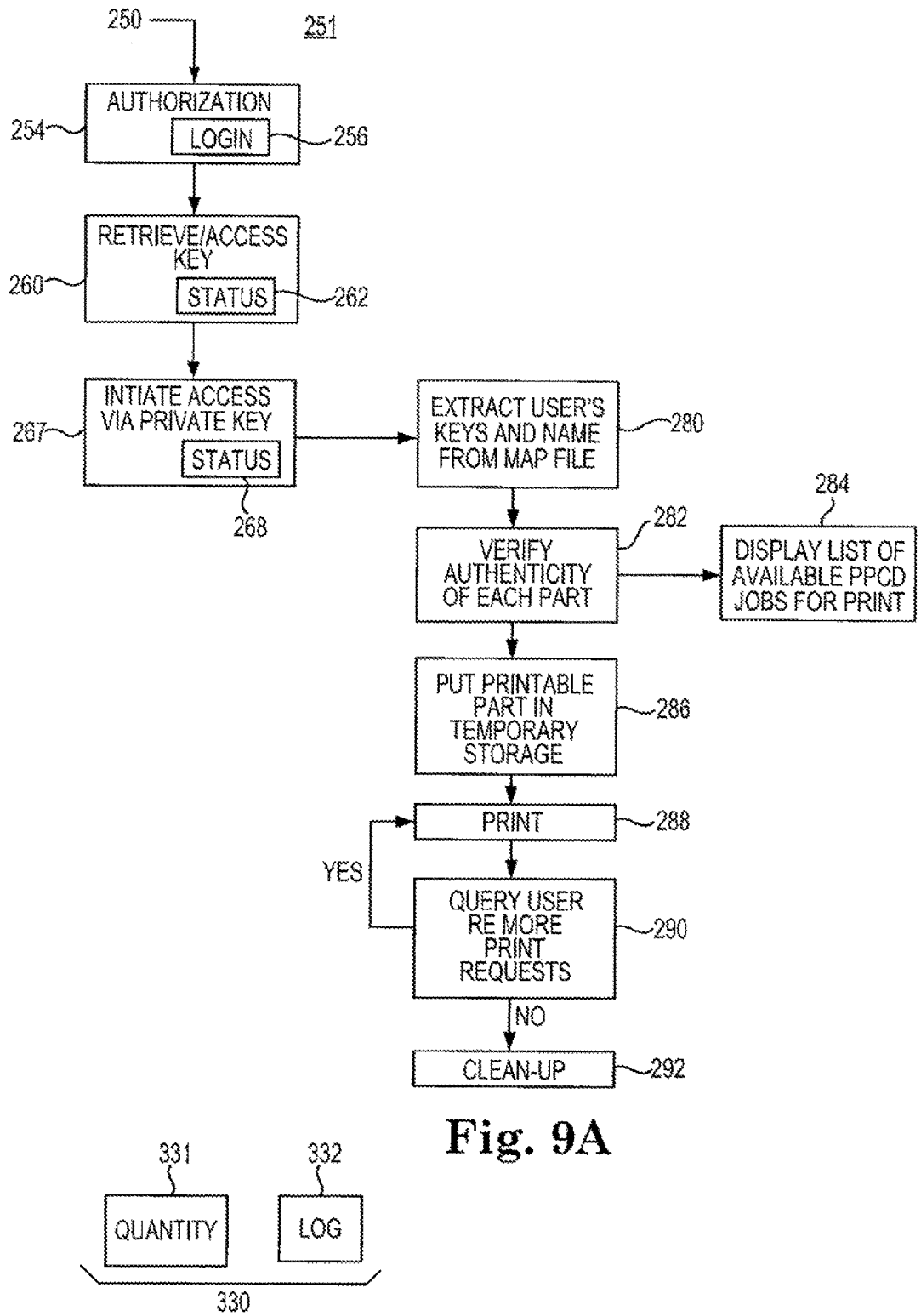
FIG. 9A is a flow diagram schematically illustrating an access protocol, according to one example of the present disclosure.
FIG. 9B is a block diagram schematically illustrating tracking parameters associated with a composite document, according to one example of the present disclosure.

FIG. 9A is a flow diagram 251 schematically illustrating at least some portions of an access protocol 250, according to one example of the present disclosure.

As shown in FIG. 9A, the access protocol 250 initiates an authorization 254. In some examples, authorization 254 is performed according to the authorization module 240, as previously described in association with FIG. 8. However, in some examples, user authorization 254 is omitted from the protocol.

In general terms, the authorization 254 is performed as part of an attempt by the user to access a private key from a resource in a manner substantially the same as previously described in association with FIG. 8. If the user authorization is successful, then retrieval of the private key/or access to the private key from the resource is completed, as shown at 260 in FIG. 9A.

However, if the user authorization is not successful, then the protocol 250 includes denying the user (e.g. participant) any further participation at the multifunction printer 10 regarding the particular composite document.

With further reference to FIG. 9A, a status 262 is reported to the user via a pop-up notification at the access module (such as access module 20 in FIG. 1, which also can be part of user interface 166 in FIG. 6) regarding whether access to their private keys is granted.

Next, upon granted access to the private key, the key is retrieved/or just accessed from the resource at which it is stored and, at 267 in FIG. 9A, an attempt is made to access the composite document via the private key at the multifunction printer 10. If the user is authorized to access a particular composite document 30, then his private key can be used to successfully decrypt some part of the composite document 30 (according to access granted).

In some examples, a user's private key is unacceptable for being the wrong key (i.e. nonmatching), invalid, corrupted, etc, or because the user is not authorized to access the composite document 30. If a user's keys are not corrupt or damaged, the might attempt to decrypt a composite document 30. If the user is authorized, the attempt to partially decrypt PPCD would be successful, and if the user is not authorized, the attempt to decrypt would fail.

In some examples, a status 268 of allowed or denied access is reported via a pop-up notification at the user interface 166 (FIG. 6). As noted elsewhere, if access is denied then in some examples, the composite document 30 (or parts of it) is immediately discarded from the multifunction printer 10 to ensure security, particularly in view of the attempted unauthorized access. Accordingly, for this particular participant, no decryption of the composite document will occur, and they will be unable to print from the composite document. In addition, in some examples, even if access were granted via a private key, if the user decides not to proceed with printing one of the listed jobs within an allowed time period, the retrieved keys are automatically discarded.

It will be noted that, prior to arrival at multifunction printer 10, in some examples the user's private key is stored and transferred in an encrypted format to ensure its protection prior to arrival at the multifunction printer 10, as previously described in association with at least FIG. 8. In one example, where a private key is fetched from on-line/cloud identity service or centralized LDAP repository, this encrypted format includes a PKCS#12 format, and is protected by a user's password-based symmetric key. In one aspect, decryption of the private key is executed via authorization module 240 (FIG. 8).

Provided that the user credentials (at authorization 254 in FIG. 9A) have been accepted and the private key has been received (access to the private key is granted) t, as shown in FIG. 9A, at 280 the protocol 250 includes, using an entry table associated with a composite document (such as a publicly-posted composite document) and extracting the user's specific symmetric key and the name of user's key-map entry (such as from map file 76 in FIG. 1). Per decryption function 24 of access module 20 (FIG. 1), the users key-map entry is then decrypted and the subset of access keys (e.g. key set 78 in FIG. 4B) corresponding to the user access is recovered.

Next, the authenticity of each part is verified (at 282 in FIG. 9A) and the parts to which user is permitted access are extracted and decrypted. In some examples, the authentication and decryption scheme are constructed via C++ of an OpenSSL Library. In some examples, decryption is constructed using resources, such as but not limited to, any one of several public libraries including: C# of a Bouncy Castle libraries (such as those available at http://bouncycastle.org); Cryptography Next Generation from Microsoft Corporation; and NSA Suite B cryptography. In some examples, this authentication corresponds to the operation of authentication function 234 in FIG. 7C.

In some examples, as part of granting access to a PPCD, the printer automatically verifies that each part of the PPCD was signed or that each collection of parts (each part having the same level of access control) was signed. If any of these verifications fail, the job processing is terminated immediately and all data is discarded. In some examples, this signature verification corresponds to signature verification function 232, as previously describe in association with FIG. 7C.

In some examples, the access protocol includes verifying all table signatures of the composite document before allowing a print job to proceed toward the printing pipeline.

In some examples, no portion of a composite document print job is submitted to the printing pipeline (at 288 in FIG. 9A) until the last signature verification is successfully completed. In one aspect, this security ensures that untrusted documents are not printed.

As further shown at 284, the access module 20 (FIG. 1) displays a list of available composite document print jobs for the particular authorized user.

However, in some examples, instead of first requesting user credentials before displaying available composite document print jobs at access module 20, the access protocol 250 displays the available encrypted jobs and unencrypted jobs at the multifunction printer 10. In this way, the user is permitted to access and print unencrypted jobs. If an encrypted job is selected for access, then the access protocol 250 follows the above-described pathway of requesting user credentials, fetching keys, etc.

With further reference to FIG. 9A, after such decryption via at least 280 in FIG. 9A, at 286 the access protocol 250 proceeds with storing the clear text parts in a temporary memory directory with exclusive access by the printer firmware. In some examples, the clear text pads remaining after decryption are in a Printer Control Language (PCL) and/or Portable Document Format (PDF) and/or text and/or Postscript.

In some examples, from the printer firmware the clear text print job is submitted into a regular printing pipeline by employing a command extension (OXPd/C#) resulting in printing the PPCD job as shown at 288 in FIG. 9A.

Accordingly, with this in mind, in some examples, the decrypting of the retrieved private key, (and its subsequent use in coordination with differential access mechanism 34 (FIG. 1) to decrypt part(s) of composite document 30) will occur just prior to printing. This arrangement further ensures the security of key set 78 and the guarded content. In some examples, the retrieved private key (28 in FIG. 1, 244 in FIG. 8) is discarded immediately once the content is recovered. In some examples, the particular recovered printable parts of the composite document print job at the multifunction printer 10 are also discarded immediately after printing (e.g. processed by the printing pipeline)

In some examples, the access protocol 250 includes a query (at 290) in which the user is prompted on whether to print more jobs using the same previously accepted user credentials. If no further printing is requested within an allowed time period, the printer 10 automatically signs off the user and follows a clean-up routine (at 292 in FIG. 7) and the private key 28, 244 is discarded as well as the recovered parts of the composite document (such as a publicly-posted composite document). On the other hand, if the user answers the query in the affirmative (e.g. YES), then more parts of the PPCD job (to which the user already has been authorized) can be printed (at 288) at the users discretion.

In some examples, as shown in FIG. 96, the composite document 30 and/or multifunction printer 10 include additional tracking resources 330, including a quantity parameter 331 and a log parameter 333. In some examples, after parts of the composite document 30 are printed for a particular participant at the multifunction printer 10, at least one of several actions follow. In some examples, the composite document is discarded. In some examples, after printing, access for a particular user (e.g. a participant who has just printed) is removed.

In some examples, after printing at the multifunction printer 10 by a participant, parts of the composite document 30 that no longer need be available for printing by other participants are removed from the composite document 30.

In some examples, after printing by a particular participant, the document is automatically processed and emailed to the next participant or other actions are performed, such as automatically sending via email a notification about the status and availability of the document to the next participant or document master.

In some examples, after printing by a particular participant at the multifunction printer 10, various logs are generated to be stored in the multifunction printer 10 or in the composite document itself.

In some examples, the log parameter 333 is implemented via access module 20 (FIG. 1) so that each act of attempting access and/or printing a part of composite document 30 is securely recorded in the composite document 30 to create an access log and/or printing log. In this way, a document master or manager can monitor proper and improper use of a composite document 30. In some examples, the document manager accesses (via access module 20) the composite document 30 directly at the multifunction printer 130 while in some examples, the multifunction printer 10 emails a log report to the document manager. In some examples, the composite document 30 is emailed along with the log report.

Figure 10:
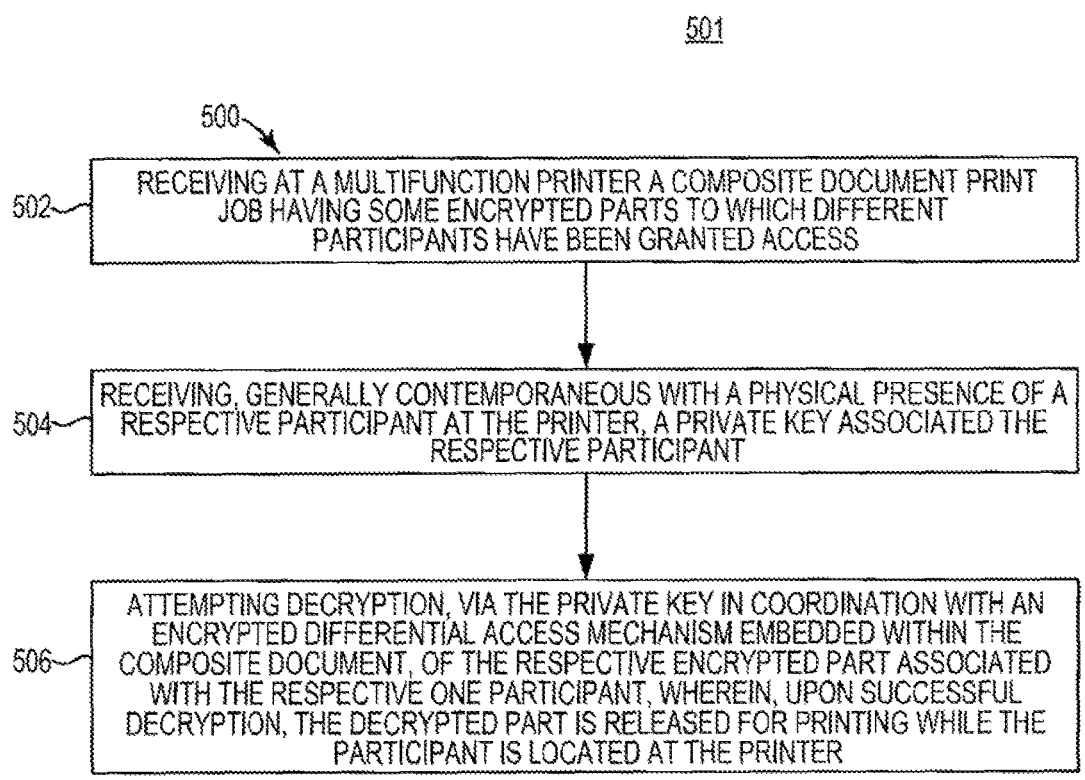
FIG. 10 is a flow diagram schematically illustrating a method of handling composite documents at a multifunction printer, according to one example of the present disclosure.

FIG. 10 is a flow diagram 501 schematically illustrating a method 500 of processing or handling composite documents at a multifunction printer, according to one example of the present disclosure. In some examples, the method 500 is performed via the systems, modules, components, functions, etc. as previously described and illustrated in association with FIGS. 1-9B. In some examples, the method 500 is performed via systems, modules, components, functions, etc. other than those previously described and illustrated in association with FIGS. 1-98.

In some examples, in a manner consistent with at least the description associated with FIG. 6, method 500 is stored as machine readable instructions within a non-transitory computer readable medium and that are generally executable by or on a processor of a multifunction printer. In one aspect, method 500 is permanently stored in, and executed by, a firmware portion of the multifunction printer 10.

In some examples, at 502 method 500 includes receiving at a multifunction printer a composite document print job having different encrypted parts to which different participants seek access.

At 504 method 500 comprises receiving, generally contemporaneous with a physical presence of a respective participant at the printer, a private key associated the respective participant.

At 506, method 500 comprises attempting decryption, via the private key in coordination with an encrypted differential access mechanism embedded within the composite document, of the respective encrypted part associated with the respective one participant, wherein, upon successful decryption, the decrypted part is released for printing while the participant is located at the printer.

At least some examples of the present disclosure facilitate selective printing, via authorized users, of composite documents at a multifunction printer. This arrangement enables the multifunction printer to employ the secure differential access controls embedded within the composite documents (such as publicly-posted composite documents) to grant access selectively among different participants to at least some parts of a composite document (based on their granted access), while harnessing the ubiquity and functionality of multifunction printers.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A multifunction printer comprising:
a processor;
a memory storing instructions that when executed by the processor cause the processor to control access among different participants, one participant at a time, to different encrypted parts of a composite document stored at the multifunction printer,
wherein to control access to the different encrypted parts of the composite document, the instructions are to cause the processor to:
authenticate a user credential of the one participant to determine whether the participant is authorized to access a private key associated with the participant stored at a resource,
in response to a successful authentication of the user credential, retrieve the private key associated with the participant from the resource,
use the private key to decrypt a subset of the different encrypted parts in the composite document to which only the participant is granted access, and
print the decrypted part.

2. The multifunction printer of claim 1, wherein the composite document includes an array of map files, each of the map files being assigned to one of the different participants and including a key set that maps to one of the different encrypted parts in the composite document, and
wherein the instructions are to cause the processor to engage, via the private key, an encrypted differential access mechanism to obtain the key set, associated with the one participant, to decrypt the encrypted part of the composite document to which the participant is granted access.

3. The multifunction printer of claim 2, wherein the instructions are to cause the processor to decrypt the key set via applying the private key to decrypt a corresponding entry in a document entry-table and subsequently decrypt the map-file associated with the one participant, wherein the key set in the map file comprises at least one of an encryption key, a decryption key, a signature key, and a verification key.

4. The multifunction printer of claim 2, wherein the composite document comprises a publicly-posted composite document in which the at least some parts include workflow print-eligible parts originating, prior to conversion into a printable format, from one of a plurality of different native format applications.

5. The multifunction printer of claim 1, wherein, via operation of an encrypted differential access mechanism embedded within the composite document, the processor of the multifunction printer operates independently of, and separate from, an external server.

6. The multifunction printer of claim 1, wherein the instructions are to cause the processor to receive and at least temporarily store the composite document at the multifunction printer.

7. The multifunction printer of claim 6, wherein the instructions are to cause the processor to perform a signature verification function to verify, prior to storage of the composite document at the multifunction printer, authenticity of signature parameters of the composite document.

8. The multifunction printer of claim 7, wherein the instructions are to cause the processor to perform an authentication function to verify an order of the signature parameters of the composite document.

9. The multifunction printer of claim 1, wherein the instructions are to cause the processor to:
receive the user credential at a user input of a control panel of the multifunction printer to determine whether the participant is authorized to access the encrypted part of the composite document, and
upon successful authorization, receive the private key from the resource.

10. The multifunction printer of claim 9, wherein the resource comprises at least one of:
a memory portion of the multifunction printer;
a user directory in communication with the multifunction printer; and
an external storage resource, wherein the multifunction printer includes an input/output mechanism to receive the private key from the external storage resource.

11. A non-transitory computer readable medium storing instructions, that when executed by a processor of a multifunction printer cause the processor to:
authenticate a user credential to determine whether a user is authorized to access a private key stored in a resource;
in response to a successful authentication of the user credential, retrieve the private key associated with the user from the resource;
use the private key to decrypt a subset of encrypted parts in a composite document to which only the user is granted access; and
print the decrypted part.

12. The non-transitory computer readable medium of claim 11, wherein the composite document includes an array of map files, each of the map files being assigned to one of a plurality of different users and including a key set that maps to one of a plurality of encrypted parts in the composite document associated with the respective user, and
wherein the instructions are to cause the processor to engage an encrypted differential access mechanism to decrypt the map-file associated with the user and obtain the key set for the encrypted part to which the user has been granted access, and then apply the key set to decrypt the encrypted part of the composite document.

13. The non-transitory computer readable medium of claim 11, wherein the instructions are to cause the processor to, prior to decrypting the map-file, apply the private key to decrypt a corresponding entry in a document entry-table.

14. A method for controlling access among different participants, one participant at a time, to at least some encrypted parts of a composite document stored at a multifunction printer, the method comprising:
authenticating a user credential of the one participant to determine whether the participant is authorized to access a private key stored in a resource;

in response to a successful authentication of the user credential, retrieving the private key associated with the participant from the resource;

using the private key to decrypt a subset of encrypted parts in the composite document to which only the participant is granted access; and selecting the decrypted part of the composite document for printing.

15. The method of claim 14, wherein the method includes:

verifying, prior to storage of the composite document at the multifunction printer, authenticity of signature parameters of the composite document; and verifying an order of the signature parameters of each part of the composite document.

\* \* \* \* \*